United States Patent
Terani et al.

(10) Patent No.: US 11,976,929 B2
(45) Date of Patent: May 7, 2024

(54) LOCALIZATION APPARATUS AND METHOD FOR VEHICLE

(71) Applicant: DENSO CORPORATION, Kariya (JP)

(72) Inventors: Ariya Terani, Kariya (JP); Itsuki Chiba, Kariya (JP); Naohiro Fujiwara, Kariya (JP); Makoto Ohkado, Kariya (JP); Keisuke Hachisuka, Kariya (JP)

(73) Assignee: DENSO CORPORATION, Kariya (JP)

( * ) Notice: Subject to any disclaimer, the term of this patent is extended or adjusted under 35 U.S.C. 154(b) by 355 days.

(21) Appl. No.: 17/129,343

(22) Filed: Dec. 21, 2020

(65) Prior Publication Data

US 2021/0190507 A1 Jun. 24, 2021

(30) Foreign Application Priority Data

Dec. 23, 2019 (JP) ................................. 2019-231733

(51) Int. Cl.
*G01C 21/36* (2006.01)
*G01C 21/00* (2006.01)
(Continued)

(52) U.S. Cl.
CPC ....... *G01C 21/3602* (2013.01); *G01C 21/005* (2013.01); *G01C 21/28* (2013.01); *G01S 13/867* (2013.01); *G01S 13/89* (2013.01); *G06F 18/25* (2023.01); *G06T 7/74* (2017.01); *G06V 10/771* (2022.01); *G06V 10/803* (2022.01);
(Continued)

(58) Field of Classification Search
CPC .. G01C 21/28; G01C 21/005; G01C 21/3602; G06T 7/74; G06T 2207/10044; G06T 2207/30252; G06V 10/98; G06V 20/56; G01S 13/867; G01S 13/89; G06K 9/6288
See application file for complete search history.

(56) References Cited

U.S. PATENT DOCUMENTS

2011/0050482 A1 3/2011 Nanami
2018/0024562 A1 1/2018 Bellaiche
(Continued)

FOREIGN PATENT DOCUMENTS

JP 2005-025497 A 1/2005
JP 2008-286566 A 11/2008
(Continued)

*Primary Examiner* — Christian Chace
*Assistant Examiner* — Katherine Marie Fitzharris
(74) *Attorney, Agent, or Firm* — MASCHOFF BRENNAN

(57) ABSTRACT

In a localization apparatus for a vehicle, a landmark detector detects a landmark from camera information acquired from a camera mounted to the vehicle. An associator associates the landmark with a specific set of radar information by setting an error region in which the landmark may exist, selecting, from a radar observation point cluster formed of a set of radar observation points corresponding to a set of radar information acquired from a radar mounted to the vehicle, a radar observation point cluster formed of a set of radar observation points included in the error region, and associating the landmark with the specific set of radar information corresponding to the selected radar observation point cluster. A positional relationship calculator calculates a positional relationship between the landmark and the vehicle based on the specific set of radar information associated with the landmark.

12 Claims, 7 Drawing Sheets

(51) Int. Cl.
  *G01C 21/28* (2006.01)
  *G01S 13/86* (2006.01)
  *G01S 13/89* (2006.01)
  *G06F 18/25* (2023.01)
  *G06T 7/73* (2017.01)
  *G06V 10/771* (2022.01)
  *G06V 10/80* (2022.01)
  *G06V 10/98* (2022.01)
  *G06V 20/56* (2022.01)

(52) U.S. Cl.
  CPC .............. *G06V 10/98* (2022.01); *G06V 20/56* (2022.01); *G06T 2207/10044* (2013.01); *G06T 2207/30252* (2013.01)

(56) References Cited

U.S. PATENT DOCUMENTS

| | | | |
|---|---|---|---|
| 2018/0182243 A1 | 6/2018 | Baba | |
| 2018/0372866 A1 | 12/2018 | Baba | |
| 2019/0071074 A1* | 3/2019 | Gokan | G05D 1/0246 |
| 2020/0211219 A1 | 7/2020 | Yamazaki et al. | |
| 2021/0096571 A1* | 4/2021 | Modalavalasa | G06V 20/58 |
| 2021/0141091 A1* | 5/2021 | Pishehvari | G01S 17/66 |

FOREIGN PATENT DOCUMENTS

| | | | | |
|---|---|---|---|---|
| JP | 2011242207 A | * | 12/2011 | .......... G01C 21/005 |
| JP | 2018-097574 A | | 6/2018 | |
| JP | 2019-532292 A | | 11/2019 | |
| JP | 2021056764 A | * | 4/2021 | |
| WO | WO-2020045317 A1 | * | 3/2020 | ............. G01C 21/28 |
| WO | WO-2020241954 A1 | * | 12/2020 | ............. B60R 11/04 |

* cited by examiner

RADAR OBSERVATION POINTS P

◯ : TRAFFIC SIGN S

◇ : PEDESTRIAN W

⬠ : LEFT CURB CL

☐ : MOTORCYCLE B

▨ : LOW-LIKELIHOOD RADAR OBSERVATION-POINT

▥ : DYNAMIC RADAR OBSERVATION-POINT

LOCALIZATION APPARATUS AND METHOD FOR VEHICLE

CROSS-REFERENCE TO RELATED APPLICATION

This application is based on and claims the benefit of priority from earlier Japanese Patent Application No. 2019-231733 filed on Dec. 23, 2019, the description of which is incorporated herein by reference.

BACKGROUND

Technical Field

The present disclosure relates to a localization technique for estimating a location of an own vehicle.

Related Art

Conventionally, a localization technique is known for estimating a location of an own vehicle using camera information, such as a camera image or the like. Such a localization technique detects a landmark from the camera information and calculates a positional relationship between the detected landmark and the own vehicle. Further, the localization technique matches the detected landmark with each landmark from map information, and based on the calculated positional relationship between the detected landmark and the own vehicle and a matched landmark from the map information, estimates a location of the own vehicle on the map.

DESCRIPTION OF SPECIFIC EMBODIMENTS

The above known localization technique using only the camera information, as disclosed in, for example, US Patent Application Publication 2018/0024562, suffers from low calculation accuracy of the positional relationship between the landmark and the own vehicle, thus leading to low localization accuracy.

In view of the above, it is desired to have a localization technique for estimating a location of an own vehicle with increased calculation accuracy of a positional relationship between a landmark and the own vehicle, which enables increased localization accuracy.

One embodiment of the present disclosure will now be described with reference to FIGS. 1-7.

In the present embodiment, a landmark is detected from a camera image. An error region in which the landmark may exist is set from the camera image. A nearby radar observation point cluster formed of a set of radar observation points included in the error region is selected from a radar observation point cluster formed of a total set of radar observation points. A static radar observation point cluster formed of a set of static radar observation points is selected from the nearby radar observation point cluster. A high-likelihood radar observation point cluster formed of a set of radar observation points of high landmark likelihood is selected from the static radar observation point cluster. The landmark likelihood of a radar observation point is a likelihood that the radar observation point is arising from the landmark. The landmark is associated with a set of radar information corresponding to the radar observation point cluster thus selected, that is, the high-likelihood radar observation point cluster. Further, the set of radar information associated with the landmark is weighted depending on the landmark likelihood of each radar observation point of the high-likelihood radar observation point cluster. A positional relationship between the landmark and the own vehicle is thereby calculated.

A localization system of the present embodiment will now be described with reference to FIG. 1. After overviewing the localization system, an associator 24 and a positional relationship calculator 25 will be described. In the following, the set of radar information may include a single piece of radar information, and the radar observation point cluster may include a single radar observation point. The term "own vehicle" as used herein refers to a vehicle equipped with the localization system.

Figure 1:
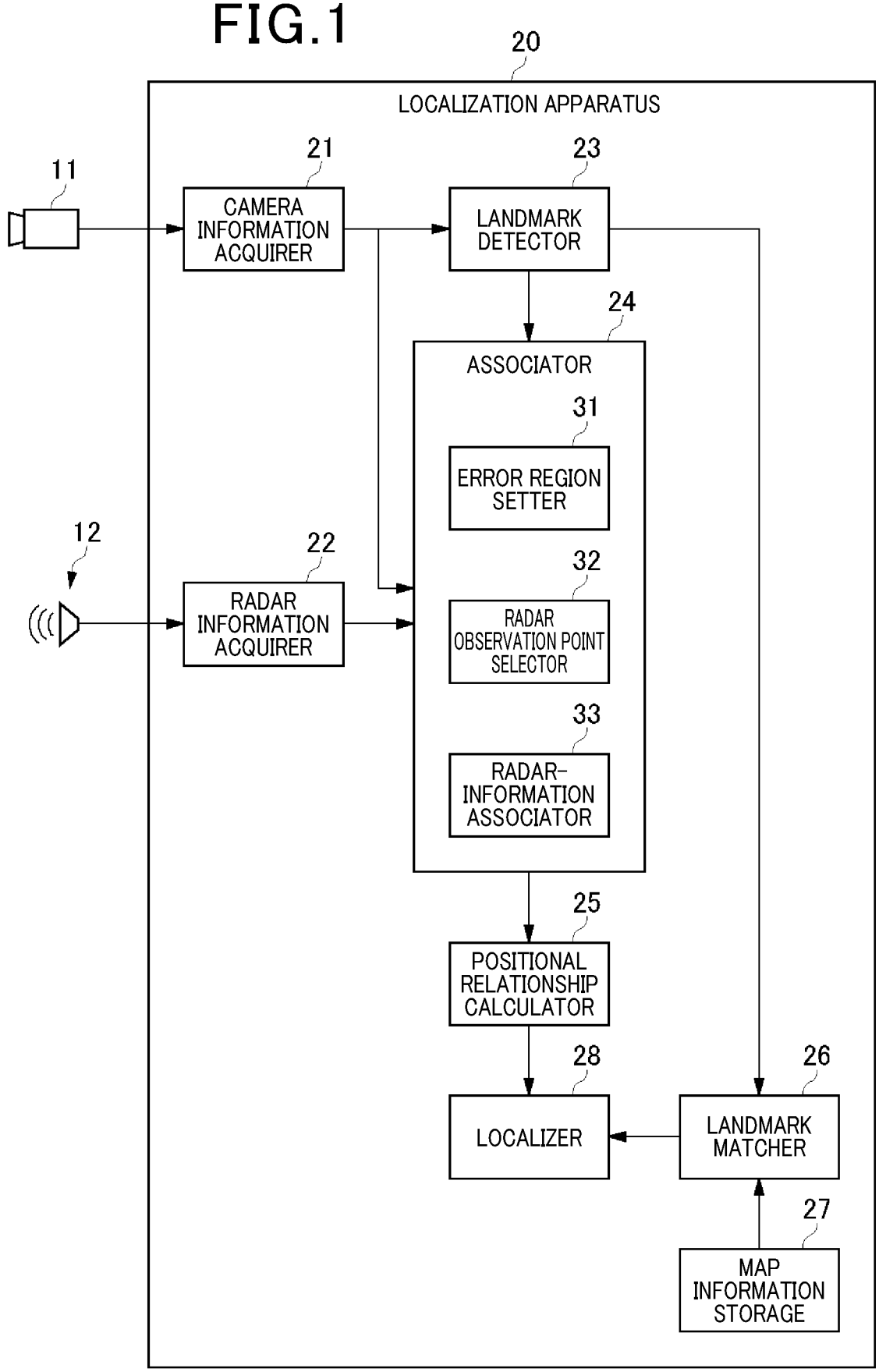
FIG. 1 is a block diagram of a localization system according to one embodiment.

As illustrated in FIG. 1, the localization system includes a camera 11, a radar 12, and in a localization apparatus 20. In the localization apparatus 20 of the localization system, a camera information acquirer 21 acquires a camera image as camera information from the camera 11 mounted to the own vehicle. A radar information acquirer 22 acquires a set of radar information from a radar 12, such as a millimeter-wave radar or the like, mounted to the own vehicle. A landmark detector 23 detects a landmark from the camera image acquired by the camera information acquirer 21. The associator 24 associates the landmark detected by the landmark detector 23 with the set of radar information acquired by the radar information acquirer 22. The positional relationship calculator 25 calculate a positional relationship between the landmark and the own vehicle based on the set of radar information associated by the associator 24 with the landmark. A landmark matcher 26 matches the landmark detected by the landmark detector 23 with each landmark from map information stored in a map information storage 27. A localizer 28 estimates a location of the own vehicle on the map based on the positional relationship between the landmark and the own vehicle calculated by the positional relationship calculator 25 and the landmark matched by the landmark matcher 26 from the map information.

In the associator 24, an error region setter 31 converts the two-dimensional (2D) camera image acquired by the camera information acquirer 21 into three-dimensional (3D) spatial information, and estimates a position of the landmark detected by the landmark detector 23 in the 3D space. Further, the error region setter 31 sets an error region in the 3D space, in which the landmark may exist. A radar observation point selector 32 selects, from a radar observation point cluster corresponding to the set of radar information acquired by the radar information acquirer 22, a radar observation point cluster included in the error region. The radar observation point selector 32 selects, from the radar observation point cluster included in the error region, a static radar observation point cluster formed of a set of static radar observation points. The radar observation point selector 32 further selects, from the static radar observation point cluster, a high-likelihood radar observation point cluster formed of a set of radar observation points of high landmark likelihood. The landmark likelihood of a radar observation point is a likelihood that the radar observation point is arising from the landmark. A radar information associator 33 associates the landmark detected by the landmark detector 23 with a set of radar information corresponding to the radar observation point cluster selected by the radar observation point selector 32, that is, the high-likelihood radar observation point cluster.

The positional relationship calculator 25 weights the set of radar information associated with the landmark, depending on the landmark likelihood, and then calculates a positional relationship between the landmark and the own vehicle.

The localization apparatus 20 of the localization system may be configured as a microcomputer including, although not shown, a central processing unit (CPU), a read-only memory (ROM), a random-access memory (RAM), and an input/output interface (I/O). The term RAM and ROM are used to describe the operation of a type of memory that may be implemented using specific types of memory such as SDRAM, DDR, PROM, EPROM, or EEPROM memory to give but a few examples.

As described above and illustrated in FIG. 1, the localization apparatus 20 includes, as functional blocks, the camera information acquirer 21, the radar information acquirer 22, the landmark detector 23, the associator 24, the positional relationship calculator 25, the landmark matcher 26, the map information storage 27, the localizer 28, where the associator 24 includes, as functional blocks, the error region setter 31, the radar observation point selector 32, and the radar information associator 33. Functions of these functional blocks may be implemented by the CPU, as a computing device, executing computer programs or instructions stored in the ROM or the like. This enables the CPU to perform functions of the functional blocks.

However, these functional blocks are not limited to such an implementation. Functions of these functional blocks may be implemented by software only, hardware only, or a combination thereof. For example, when these functions are provided by an electronic circuit which is hardware, the electronic circuit can be provided by a digital circuit including many logic circuits, an analog circuit, or a combination thereof.

As used in this specification and any claims of this application, the terms "computer", "processor", and "memory" all refer to electronic devices. These terms exclude people or groups of people. As used in this specification and any claims of this application, the term "non-transitory computer-readable storage medium" is entirely restricted to tangible, physical objects that store information in a form that is readable by electronic devices. These terms exclude any wireless or other transitory signals.

A localization method of the present embodiment will now be described with reference to FIGS. 2-7.

Figure 2:
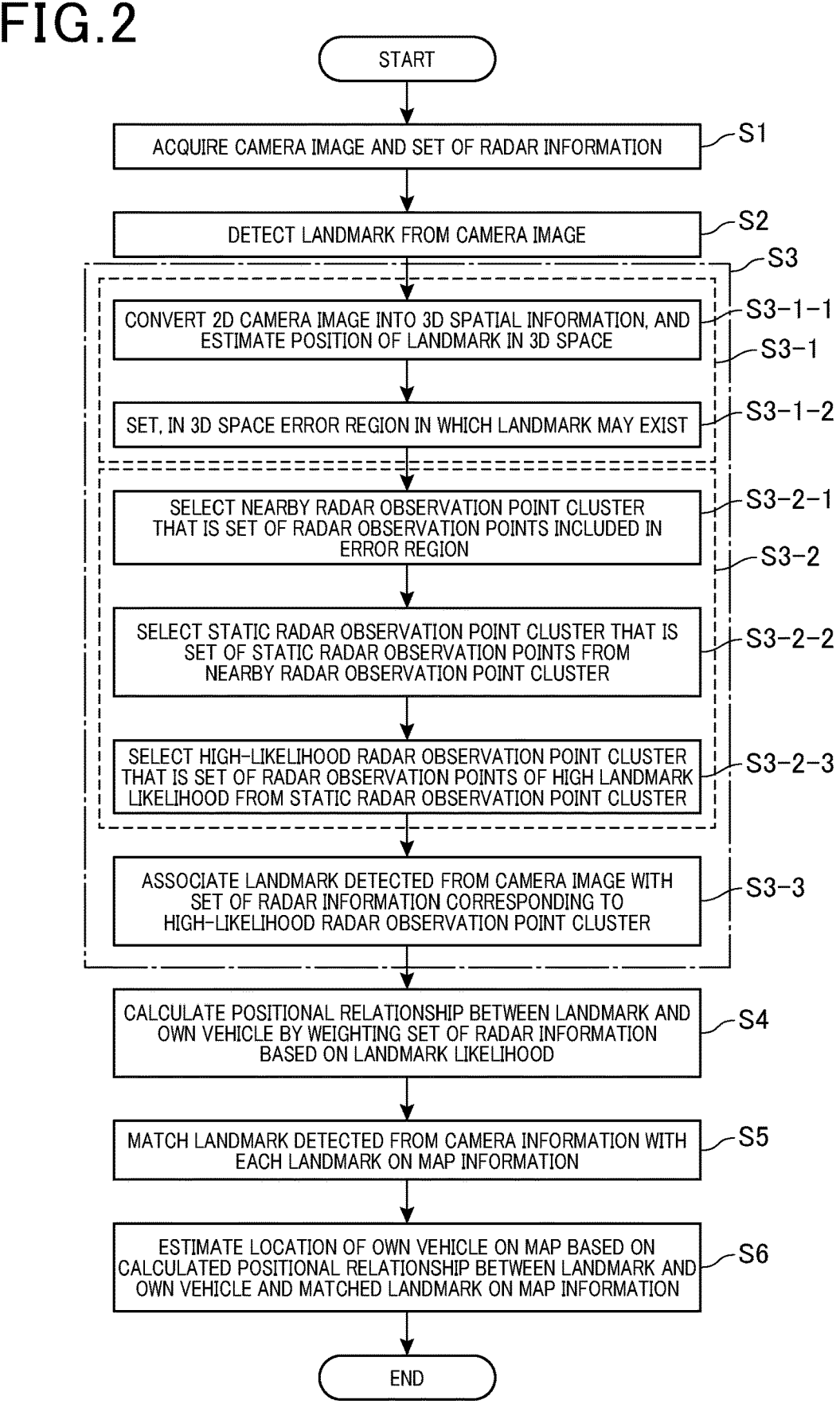
FIG. 2 is a flowchart of a localization method according to one embodiment.

As illustrated in FIG. 2, the localization method includes the following steps.

Information Acquisition Step S1

At information acquisition step S1, a camera image I is acquired as camera information from the camera mounted to the own vehicle. A set of radar information is acquired from a radar, such as a millimeter-wave radar or the like, mounted to the own vehicle. In the present embodiment, radar information for each radar observation point includes a distance, an azimuth, and a speed of the radar observation point relative to the own vehicle, and the radar reflection intensity of the radar observation point as the landmark likelihood which is a likelihood that the radar observation point is arising from a landmark. In an alternative embodiment, the radar cross section (RCS) may be used as the landmark likelihood instead of the radar reflection intensity. In another alternative embodiment, a combination of the radar reflection intensity and the radar cross section may be used as the landmark likelihood.

Landmark Detection Step S2

At landmark detection step S2, a landmark is detected from the camera image I acquired at information acquisition step S1. In order to detect a landmark, an appropriate image recognition method based on machine learning, such as deep learning or the like, may be used. For example, semantic segmentation (SS) may be used.

Figure 3:
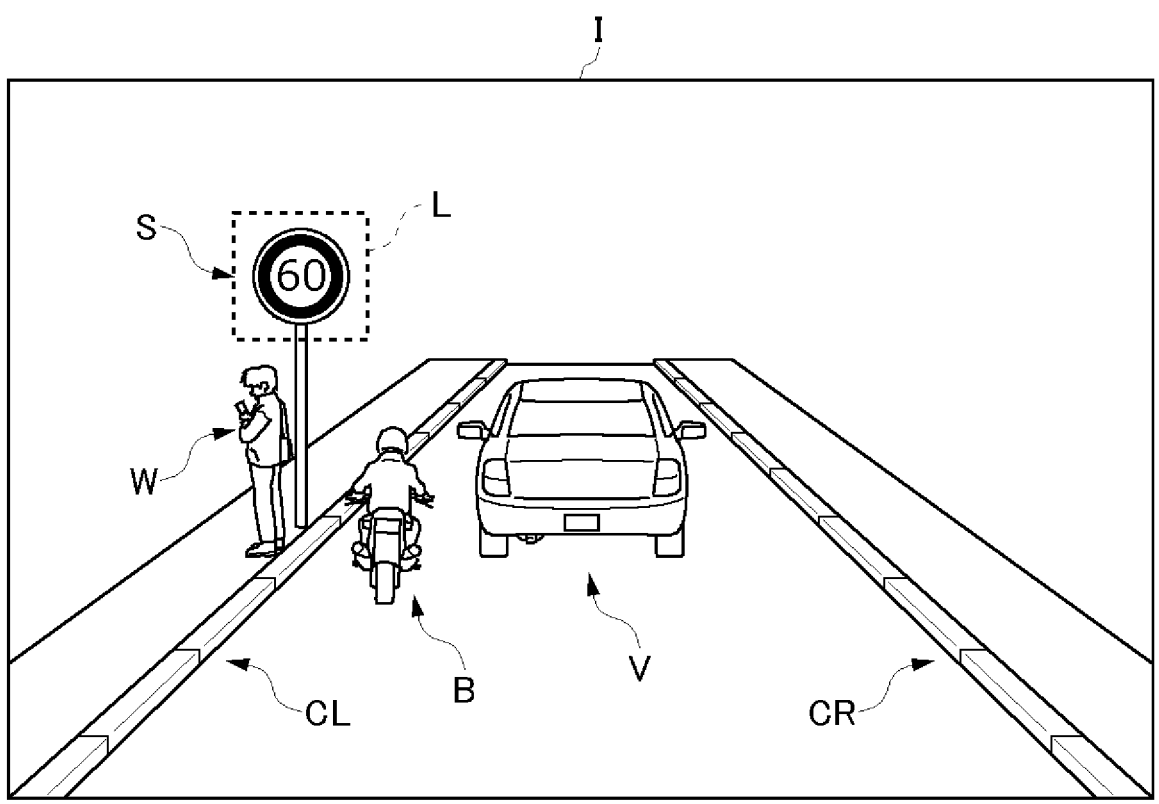
FIG. 3 is an illustration of a landmark detection step.

In an example illustrated in FIG. 3, the camera image I includes a traffic sign S, a stationary pedestrian W, a left curb CL, a running motorcycle B, a running vehicle V, and a right curb CR. The traffic sign S is detected as a landmark L.

Association Step S3

At association step S3, the following error region setting step S3-1, radar observation point selection step S3-2, and radar information association step S3-3 are performed to associate the landmark L detected at landmark detection step S2 with the set of radar information acquired at information acquisition step S1.

Error Region Setting Step S3-1

At error region setting step S3-1, localization step S3-1-1 and region setting step S3-1-2 are performed to set, in a 3D space, an error region in which the landmark detected at landmark detection step S2 may exist.

Localization Step S3-1-1

At localization step S3-1-1, the 2D camera image acquired at information acquisition step S1 is converted into 3D spatial information. A position of the landmark detected at landmark detection step S2 in the 3D space is estimated. An appropriate conversion method, such as structure from motion (SFM), may be used in conversion of the 2D camera image into the 3D spatial information.

Figure 4:
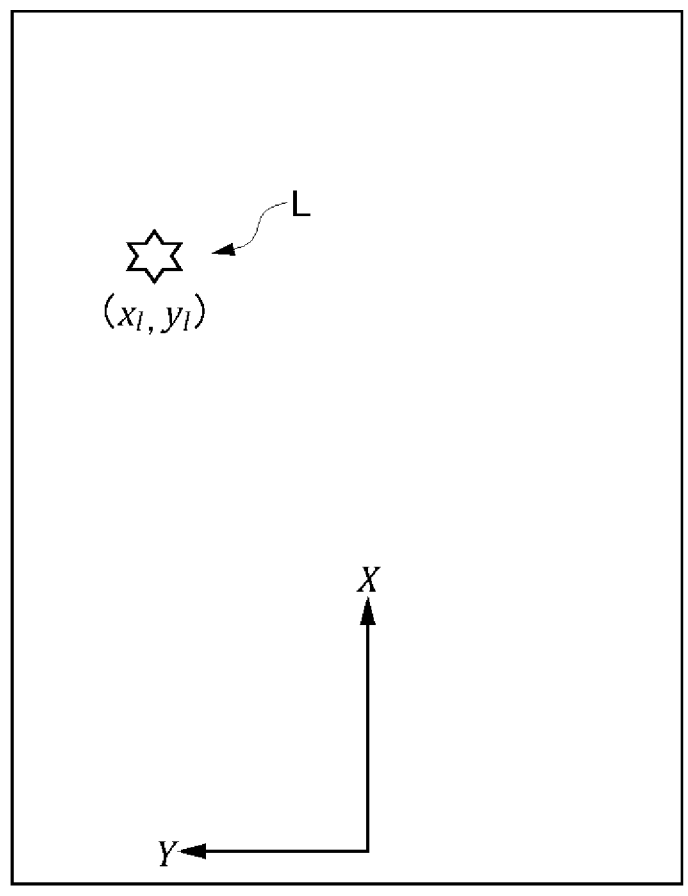
FIG. 4 is an illustration of a localization step.

In the present embodiment, as illustrated in FIG. 4, in the coordinate system with x- and y-axes respectively extending in the longitudinal and lateral directions of the own vehicle O, the cartesian coordinates (xI, yI) of the landmark L are calculated.

Region Setting Step S3-1-2

At region setting step S3-1-2, an error region in the 3D space, in which the landmark may exist, is set based on the position of the landmark estimated at localization step S3-1-1. The error region is determined by various error factors. The error factors may include a distance from the own vehicle to the landmark acquired form the camera image, the size of the landmark, a driving environment, and other factors.

The resolution of the camera image is fixed despite a landmark at a larger distance from the own vehicle and of a smaller size being represented as smaller in the camera image. Thus, the localization accuracy decreases for a landmark at a larger distance from the own vehicle and of a smaller size in the 3D space, which leads to a need for a larger error region to be set in which the landmark may exist. In addition, as the driving environment deteriorates during nighttime, in poor weather, or when backlit, the identification accuracy in the camera image decreases, which also leads to a need for a larger error region to be set.

Due to such characteristics of localization based on the camera image, the accuracy of localization based on the camera image may be lower than the accuracy of localization based on the set of radar information. In particular, an error length in the longitudinal direction of the own vehicle may be greater than an error length in the lateral direction of the own vehicle.

Figure 5A:
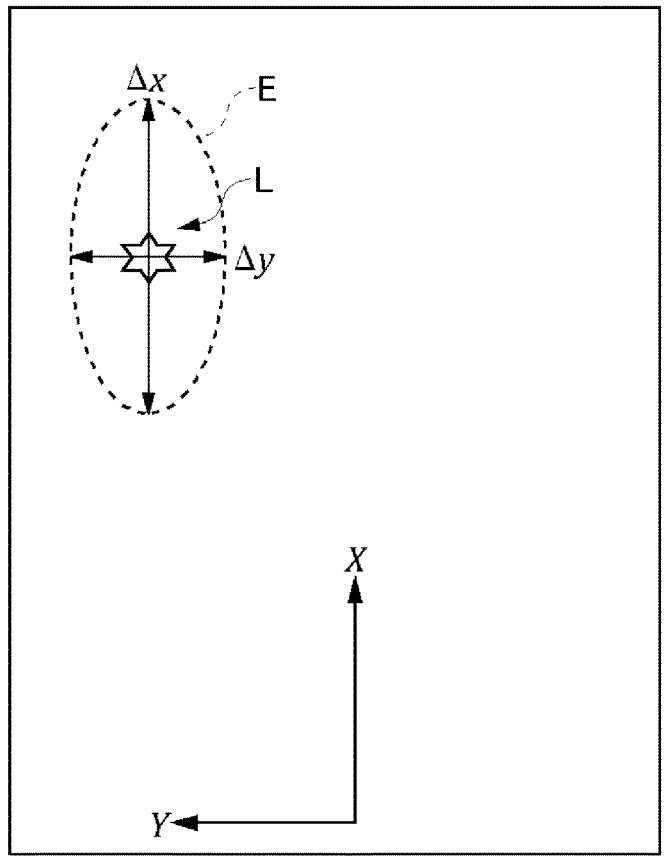
FIG. 5A is an illustration of an error region setting step.

In the present embodiment, as illustrated in FIG. 5A, an elliptical error region E, centered at the calculated x- and y-coordinates (xI, yI) of the landmark L, is set in the X-Y coordinate system, where Δx and Δy are error lengths in X- and Y-axis directions, respectively. The error lengths Δx and Δy are expressed by the following equation (1):

$$\Delta k = \Delta d_k + \Delta s_k + \Delta u_k = \alpha_k(d) + \beta_k(s) + \gamma_k(u)(k=x,y) \quad (1)$$

Figure 5B:
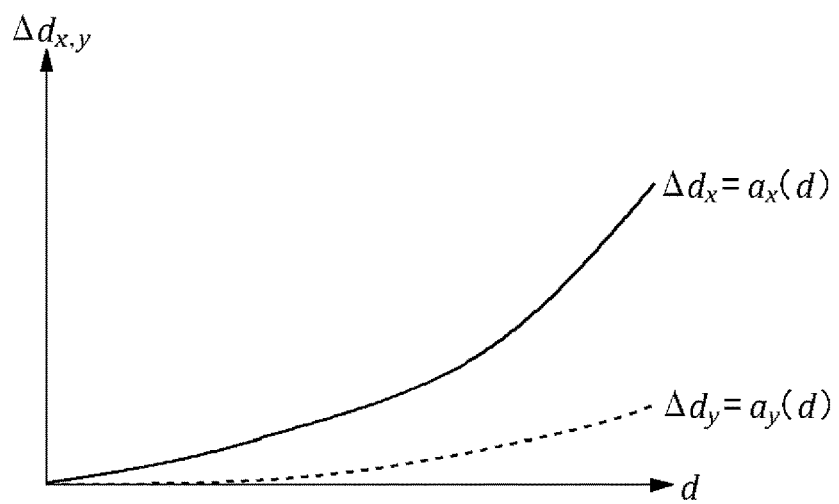
FIG. 5B is an example of an error length as a monotonically increasing function of distance.

Here, d, s, u are respectively a distance from the own vehicle O to the landmark L calculated from the camera image I, the size of the landmark L, and a measure indicative of how poor the driving environment is. Δd, Δs, Δu are error lengths arising from the respective error factors. $\alpha(d)$ is a monotonically increasing function of d as illustrated in FIG. 5B. $\beta(s)$ and $\gamma(u)$ are similar monotonically increasing functions.

Radar Observation Point Selection Step S3-2

At radar observation point selection step S3-2, nearby radar observation point selection step S3-2-1 and static radar observation point selection step S3-2-2, and high-likelihood radar observation point selection step S3-2-3 are performed to select, from a radar observation point cluster corresponding to the set of radar information acquired at information acquisition step S1, a radar observation point cluster likely arising from the landmark.

Nearby Radar Observation Point Selection Step S3-2-1

At nearby radar observation point selection step S3-2-1, a nearby radar observation point cluster formed of a set of radar observation points included in the error region E set at region setting step S3-1-2 is selected from the radar observation point cluster corresponding to the set of radar information acquired at information acquisition step S1.

The nearby radar observation point cluster formed of a set of radar observation points included in the error region in which the landmark may exist is likely to be radar observation points arising from the landmark. This is why such a nearby radar observation point cluster is selected. On the other hand, outlier radar observation points, that is, radar observation points not included in the error region, are less likely to be radar observation points arising from the landmark, thus to be excluded.

Figure 6:
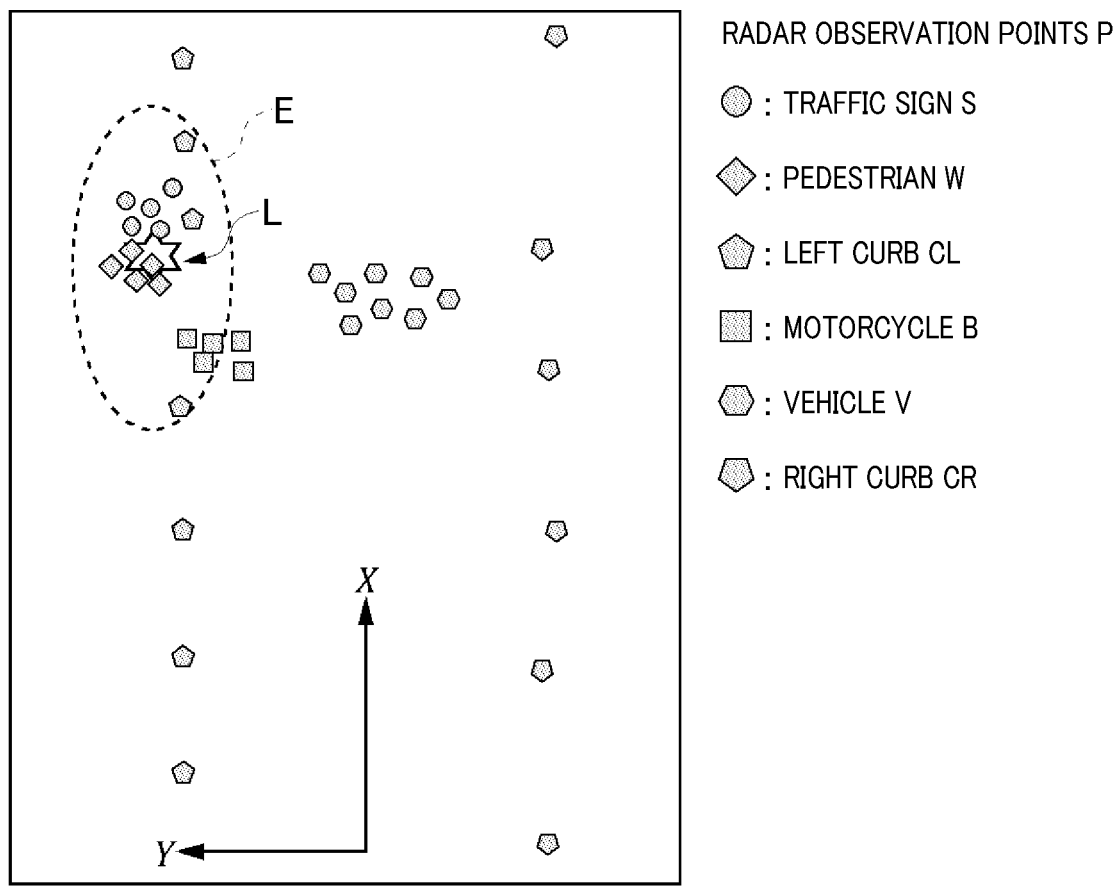
FIG. 6 is an illustration of a nearby radar observation point selection step.

In the present embodiment, as illustrated in FIG. 6, x- and y-coordinates of each radar observation point in the X-Y coordinate system are calculated based on the distance and azimuth of the radar observation point relative to the own vehicle O. In the X-Y coordinate system, radar observation points included in the error region E are selected.

As illustrated in FIG. 6, a traffic sign S, a stationary pedestrian W, a left curb CL, a running motorcycle B, a running vehicle V, a right curb CR and others are included in the camera image I, where the traffic sign S is detected as a landmark L. A radar observation point cluster arising from the traffic sign S, the stationary pedestrian W, a part of the left curb CL, a part of the running motorcycle B are included in the error region E. This radar observation point cluster is selected as a set of nearby radar observation points, that is, a nearby radar observation point cluster. A radar observation point cluster arising from the remaining part of the left curb CL, the remaining part of the running motorcycle B, the running vehicle V, and the right curb CR is not included in the error region E, thus to be excluded as outlier radar observation points.

Static Radar Observation Point Selection Step S3-2-2

At static radar observation point selection step S3-2-2, a static radar observation point cluster formed of a set of static radar observation points is selected from the nearby radar observation point cluster selected at nearby radar observation point selection step S3-2-1.

The landmark is not a moving object, but a stationary object on the map. Each static radar observation point is therefore likely to be a radar observation point arising from the landmark. This is why such a static radar observation point cluster is selected. Each radar observation point that is not a static radar observation point, but a dynamic radar observation point, is less likely to be a radar observation point arising from the landmark, thus to be excluded.

Various determination methods may be used to determine, for each radar observation point, whether the radar observation point is a static radar observation point. In the present embodiment, if, based on a relative speed v of the radar observation point relative to the own vehicle and a speed μ of the own vehicle, it is determined that a speed v of the radar observation point (v=|v+μ|) is equal to or less than a predetermined threshold ε (a positive constant near zero), then it is determined that the radar observation point is a static radar observation point. If it is determined the speed v of the radar observation point is greater than the predetermined threshold ε, then it is determined that the radar observation point is not a static radar observation point, but a dynamic radar observation point.

As described above, in the present embodiment, as illustrated in FIG. 6, a radar observation point cluster arising from the traffic sign S, the stationary pedestrian W, a part of the left curb CL, a part of the running motorcycle B is included in the error region E in which the traffic sign S as the landmark L may exist. This radar observation point cluster is selected as a set of nearby radar observation points. Further, in the example illustrated in FIG. 7, each of the radar observation points arising from the traffic sign S as the landmark L, the stationary pedestrian W, and the part of the left curb CL is determined and selected as a static radar observation point. Each of the radar observation points arising from the part of the running motorcycle B is determined not as a static radar observation point, but as a dynamic radar observation point, and thus to be excluded.

High-Likelihood Radar Observation Point Selection Step S3-2-3

At high-likelihood radar observation point selection step S3-2-3, a high-likelihood radar observation point cluster formed of a set of radar observation points of high landmark likelihood is selected from the static radar observation point cluster selected at static radar observation point selection step S3-2-2. The landmark likelihood of a radar observation point is a likelihood that the radar observation point is arising from the landmark.

A radar observation point of high landmark likelihood is likely to be a radar observation point arising from the landmark, and therefore selected. A radar observation point of low landmark likelihood is less likely to be a radar observation point arising from the landmark, and thus excluded.

Various determination measures may be used as the landmark likelihood. Typically, an object forming a landmark is characterized by a high radar reflection intensity. Therefore, in the present embodiment, the radar reflection intensity may be used as the landmark likelihood. A radar observation point with the radar reflection intensity equal to or greater than a predetermined threshold is determined to be a high-likelihood radar observation point, and thus selected. A radar observation point with the radar reflection intensity less than the predetermined threshold is determined to be a low-likelihood radar observation point, and thus excluded.

As described above, in the example illustrated in FIG. 7, each of the radar observation points arising from the traffic sign S as the landmark L, the stationary pedestrian W, and a part of the left curb CL are determined to be a static radar observation point and selected. Further, in the example illustrated in FIG. 7, each of the radar observation points arising from the traffic sign S as the landmark L, and a part of the stationary pedestrian W, with the radar reflection intensity equal to or greater than the predetermined threshold, is determined to be a high-likelihood radar observation point, and thus selected. Each of the radar observation points arising from the remaining part of the stationary pedestrian W and the part of the left curb CL, with the radar reflection intensity less than the predetermined threshold, is determined to be a low-likelihood radar observation point, and thus excluded.

Radar Information Association Step S3-3

At radar information association step S3-3, the landmark detected at landmark detection step S2 is associated with a set of radar information corresponding to the radar observation point cluster selected at radar observation point selection step S3-2, that is, the high-likelihood radar observation point cluster.

As described above, in the example illustrated in FIG. 7, the radar observation point cluster formed of the radar observation points P1-P6 arising from the traffic sign S as the landmark L and the part of the pedestrian W is selected. The traffic sign S as the landmark L is associated with the set of radar information corresponding to the selected radar observation point cluster formed of the radar observation points P1-P6.

Positional Relationship Calculation Step S4

At positional relationship calculation step S4, based on the set of radar information associated at association step S3 with the landmark detected at landmark detection step S2, a positional relationship between the landmark and the own vehicle is calculated.

At positional relationship calculation step S4, various positional relationships between the landmark and the own vehicle may be calculated. In the present embodiment, based on distances from all of the radar observation points that correspond to the set of radar information associated with the landmark to the own vehicle, a positional relationship between the landmark and the own vehicle is calculated.

In order to calculate the positional relationship between the landmark and the own vehicle, the set of radar information corresponding to the high-likelihood radar observation point cluster is weighted based on the landmark likelihood of each of the radar observation points of the high-likelihood radar observation point cluster. Radar information corresponding to a radar observation point of higher landmark likelihood is more heavily weighted while radar information corresponding to a radar observation point of lower landmark likelihood is less heavily weighted.

Various weighting methods may be used to weight the set of radar information based on the landmark likelihood. In the present embodiment, as shown in the following equation (2) where the radar reflection intensity is used as the landmark likelihood, the distance between the landmark and the own vehicle is calculated by calculating a weighted average of the distances from all of the radar observation points that correspond to the set of radar information associated with the landmark to the own vehicle.

$$R = \Sigma_j \omega_j(w) \cdot r_j / \Sigma_j \omega_j(w) \quad (2)$$

Here, R represents a distance between the landmark and the own vehicle, j (=1, 2, . . . , the number of the radar observation points that correspond to the set of radar information associated with the landmark L) represents a lower index indicating the j-th radar observation point (j being assigned in an arbitrary order), rj represents a distance from the j-th radar observation point to the own vehicle, w represents the radar reflection intensity as the landmark likelihood, and ωj(w) represents a weighting factor for the j-th radar observation point that is a monotonically increasing function of w.

Figure 7:
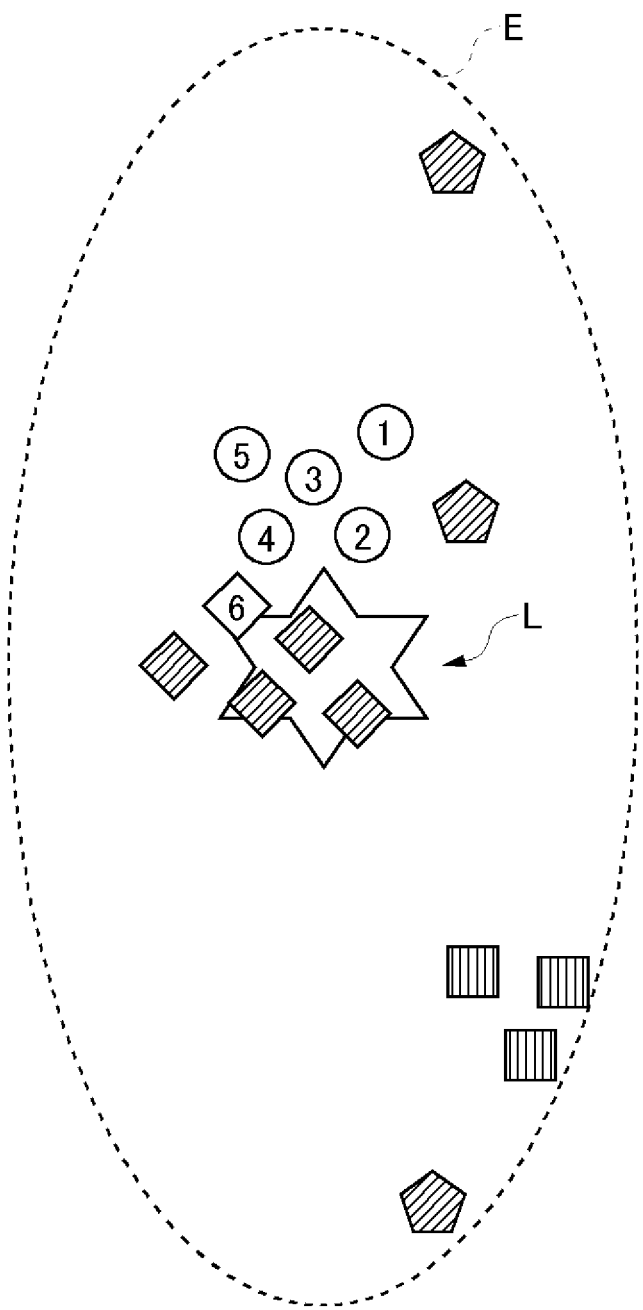
FIG. 7 is an illustration of a static radar observation point selection step and a high-likelihood radar observation point selection step.

In the example illustrated in FIG. 7, since the radar reflection intensity, as the landmark likelihood, of each of the radar observation points P1-P5 arising from the traffic sign S as the landmark L is high, the radar information corresponding to these radar observation points P1-P5 is heavily weighted. Since the radar reflection intensity of the radar observation point P6 arising from a part of the stationary pedestrian W is relatively low, the radar information corresponding to this radar observation point P6 is less heavily weighted.

Landmark Matching Step S5

At landmark matching step S5, the landmark detected at landmark detection step S2 is matched with each landmark from the map information.

Localization Step S6

At localization step S6, a location of the own vehicle on the map is estimated based on the positional relationship between the landmark and the own vehicle calculated at positional relationship calculation step S4 and the landmark from the map information matched at landmark matching step S5.

The localization system and method of the present embodiment can provide the following advantages.

In the localization system and method of the present embodiment, a landmark is detected from a camera image. An error region in which the landmark may exist is set. A radar observation point cluster included in the error region is selected from a radar observation point cluster formed of a total set of radar observation points. The landmark is associated with a set of radar information corresponding to the selected radar observation point cluster. A positional relationship between the landmark and the own vehicle is calculated based on the set of radar information associated with the landmark. The accuracy of calculation of the positional relationship between the landmark and the own vehicle from the set of radar information is higher than the accuracy of calculation of the positional relationship between the landmark and the own vehicle from the camera image. Particularly, the accuracy of calculation of the positional relationship between the landmark and the own vehicle from the set of radar information is increased as compared to the accuracy of calculation of the positional relationship between the landmark and the own vehicle solely from the camera image, which enables increased localization accuracy.

In localization of the landmark in the 3D space from the camera image, main error factors include a distance from the own vehicle to the landmark, the size of the landmark, and a driving environment, acquired from the camera image. The error region in which the landmark may exist is set from the camera image based on these main error factors, which allows the error region to be appropriately set.

The landmark is a stationary object on the map. Therefore, in associating the landmark with the set of radar information, a static radar observation point cluster formed of a set of static radar observation points is selected from the radar observation point cluster included in the error region in which the landmark may exist. A high-likelihood radar observation point cluster formed of a set of radar observation points of high landmark likelihood is selected from the static radar observation point cluster. The landmark likelihood of a radar observation point is a likelihood that the radar observation point is arising from the landmark. The landmark is associated with the set of radar information corresponding to the high-likelihood radar observation point cluster selected. This allows the landmark to be associated with the set of radar information corresponding to the radar observation point cluster likely arising from the landmark, thus enabling appropriate association of the landmark with the set of radar information.

In addition, in calculating the positional relationship between the landmark and the own vehicle based on the set of radar information, the set of radar information corresponding to the radar observation point cluster is weighted based on the landmark likelihood of each of the radar observation points of the radar observation point cluster. Therefore, the positional relationship between the landmark and the own vehicle can be calculated such that a set of radar information corresponding to a radar observation point cluster more likely arising from the landmark is more heavily weighted while a set of radar information corresponding to a radar observation point cluster less likely arising from the landmark is less heavily weighted. This enables much increased accuracy of calculation of the positional relationship between the landmark and the own vehicle.

Modifications

In the above embodiment, at high-likelihood radar observation point selection step S3-2-3, a radar observation point with the radar reflection intensity equal to or greater than a predetermined threshold is determined to be a high-likelihood radar observation point, and thus selected. In the alternative embodiment where the radar cross section (RCS) is used as the landmark likelihood, at high-likelihood radar observation point selection step S3-2-3, a radar observation point with the radar cross section equal to or greater than a predetermined threshold may be determined to be a high-likelihood radar observation point, and thus selected. In the alternative embodiment where a combination of the radar reflection intensity and the radar cross section are used as the landmark likelihood, at high-likelihood radar observation point selection step S3-2-3, a radar observation point with at least one of the radar reflection intensity and the radar cross section (RCS) equal to or greater than a predetermined threshold may be determined to be a high-likelihood radar observation point, and thus selected. Instead, given a monotonically increasing function of the radar reflection intensity and the radar cross section, a radar observation point with the function of the radar reflection intensity and the radar cross section equal to or greater than a predetermined threshold may be determined to be a high-likelihood radar observation point, and thus selected.

In the above embodiment, the localization system and method have been described. The present disclosure may also be implemented in various forms such as a computer program for causing a computing device to implement functions of the localization system, a computer program for causing a computing device to perform steps of the localization method, or a non-transitory memory, such as a semiconductor memory, storing the computer program.

What is claimed is:

1. A localization apparatus for a vehicle, comprising:
   a non-transitory memory storing one or more computer programs; and
   a processor executing the one or more computer programs to:
   detect a landmark from camera information acquired from a camera mounted to the vehicle;
   associate the landmark with a specific set of radar information, wherein associating the landmark comprises:
      set an error region in which the landmark that is detected may exist according to error factors, the error factors comprising a distance from the vehicle to the landmark acquired from the camera information, a size of the landmark, and a driving environment, the error region being set larger for a landmark at a larger distance from the vehicle and of a smaller size;
      select, from a radar observation point cluster formed from a set of radar observation points corresponding to a set of radar information acquired from a radar mounted to the vehicle, a radar observation point cluster formed from a set of radar observation points included in the error region;
      associate the landmark with the specific set of radar information that is a set of radar information corresponding to the radar observation point cluster; and
   calculate a positional relationship between the landmark and the vehicle based on the specific set of radar information that is associated.

2. The localization apparatus according to claim 1, wherein
   the processor executes the one or more computer programs to
   set the error region based on at least one of error factors acquired from the camera information, the error factors including a distance from the vehicle to the landmark, a size of the landmark, and a driving environment of the vehicle.

3. The localization apparatus according to claim 1, wherein
   the processor executes the one or more computer programs to
   select, from the radar observation point cluster included in the error region, a static radar observation point cluster formed of a set of static radar observation points.

4. The localization apparatus according to claim 1, wherein
   the processor executes the one or more computer programs to
   select, from the radar observation point cluster included in the error region, a high-likelihood radar observation point cluster formed of a set of radar observation points of high landmark likelihood, the landmark likelihood of a radar observation point being a likelihood that the radar observation point is arising from the landmark.

5. The localization apparatus according to claim 3, wherein
   the processor executes the one or more computer programs to
   select, from the static radar observation point cluster included in the error region, a high-likelihood radar observation point cluster formed of a set of radar observation points of high landmark likelihood, the landmark likelihood of a radar observation point being a likelihood that the radar observation point is arising from the landmark.

6. The localization apparatus according to claim 1, wherein the processor executes the one or more computer programs to calculate a positional relationship between the landmark and the vehicle by weighting the set of radar information corresponding to the selected radar observation point cluster, depending on a landmark likelihood of each radar observation point of the radar observation point cluster selected, the landmark likelihood of a radar observation point being a likelihood that the radar observation point is arising from the landmark.

7. The localization apparatus according to claim 5, wherein the processor executes the one or more computer programs to calculate a positional relationship between the landmark and the vehicle by weighting the set of radar information corresponding to the high-likelihood radar observation point cluster, depending on a landmark likelihood of each radar observation point of the high-likelihood radar observation point cluster.

8. The localization apparatus according to claim 4, wherein at least one of a radar reflection intensity and a radar cross section of a radar observation point is used as the landmark likelihood of the radar observation point.

9. The localization apparatus according to claim 5, wherein at least one of a radar reflection intensity and a radar cross section of a radar observation point is used as the landmark likelihood of the radar observation point.

10. The localization apparatus according to claim 6, wherein at least one of a radar reflection intensity and a radar cross section of a radar observation point is used as the landmark likelihood of the radar observation point.

11. A localization method for a vehicle, comprising:

detecting a landmark from camera information acquired from a camera mounted to the vehicle;

associating the landmark with a specific set of radar information, the associating comprising:

setting an error region in which the landmark may exist according to error factors, the error factors comprising a distance from the vehicle to the landmark acquired from the camera information, a size of the landmark, and a driving environment, the error region being set larger for a landmark at a larger distance from the vehicle and of a smaller size, selecting, from a radar observation point cluster formed from a set of radar observation points corresponding to a set of radar information acquired from a radar mounted to the vehicle, a radar observation point cluster formed from a set of radar observation points included in the error region, and associating the landmark with the specific set of radar information that is a set of radar information corresponding to the selected radar observation point cluster included in the error region; and calculating a positional relationship between the landmark and the vehicle based on the specific set of radar information that is associated with the landmark.

12. A non-transitory computer-readable storage medium having stored therein instructions executable by a computing device to cause the computing device to perform functions comprising:

detecting a landmark from camera information acquired from a camera mounted to a vehicle;

associating the landmark with a specific set of radar information, the associating comprising:

setting an error region in which the landmark may exist according to error factors, the error factors comprising a distance from the vehicle to the landmark acquired from the camera information, a size of the landmark, and a driving environment, the error region being set larger for a landmark at a larger distance from the vehicle and of a smaller size, selecting, from a radar observation point cluster formed from a set of radar observation points corresponding to a set of radar information acquired from a radar mounted to the vehicle, a radar observation point cluster formed from a set of radar observation points included in the error region, and associating the landmark with the specific set of radar information that is a set of radar information corresponding to the selected radar observation point cluster included in the error region; and calculating a positional relationship between the landmark and the vehicle based on the specific set of radar information that is associated with the landmark.

* * * * *